United States Patent [19]
Baumann

[11] Patent Number: 6,088,121
[45] Date of Patent: Jul. 11, 2000

[54] METHOD AND DEVICE FOR OPTICALLY READING A DOCUMENT MODEL WITH A SCANNER AND FOR PRINTING A RECORDING MEDIUM WITH A PRINTER

[76] Inventor: Friedrich Erwin Baumann, Bündackerstrasse 48, 3047 Bremgarten, Switzerland

[21] Appl. No.: 08/809,597
[22] PCT Filed: Oct. 3, 1995
[86] PCT No.: PCT/CH95/00223
 § 371 Date: Apr. 2, 1997
 § 102(e) Date: Apr. 2, 1997
[87] PCT Pub. No.: WO96/10881
 PCT Pub. Date: Apr. 11, 1996

[30] Foreign Application Priority Data

Oct. 3, 1994 [CH] Switzerland ............... 2969/94

[51] Int. Cl.⁷ .............. B41B 15/00; B41J 15/00; G06F 15/00
[52] U.S. Cl. .......................................... 358/1.18
[58] Field of Search .................. 395/117, 106; 707/507, 508; 358/1.18, 1.6

[56] References Cited

U.S. PATENT DOCUMENTS

| | | | |
|---|---|---|---|
| 4,511,242 | 4/1985 | Ashbee et al. ............... | 355/14 |
| 4,930,089 | 5/1990 | Hatakeyama et al. ............... | 395/105 |
| 5,228,100 | 7/1993 | Takeda et al. ............... | 382/175 |
| 5,544,045 | 8/1996 | Garland et al. ............... | 704/3 |

*Primary Examiner*—Amelia Au
*Assistant Examiner*—F. E. Cooperrider
*Attorney, Agent, or Firm*—Oblon, Spivak, McClelland, Maier & Neustadt, P.C.

[57] ABSTRACT

A printer/scanner unit includes a scanner for optically reading a document model and a printer to print a recording medium. The document model is transported along a transport path from a feed device to an output device of a transport device. After the scanning step, the document model is displayed on a screen and can be completed there with supplementary data, supplied, for example, by means of a data input device, such as a keyboard or a data memory. A document model which has been scanned askew, for example, can be shifted to a position which has been defined for completion with supplementary data, and can possibly be altered in size. It is foreseen that then only the data with which the document model on the screen is to be completed are transmitted to the printer, and the supplementary data are printed on the original of the document model, which was previously scanned. For that purpose, the data must be converted with transformation parameters, which the computer has obtained from the aforementioned shift of the scanned model into the defined position. The device is particularly suitable for filling in original, pre-printed forms or completing them with other data.

20 Claims, 5 Drawing Sheets

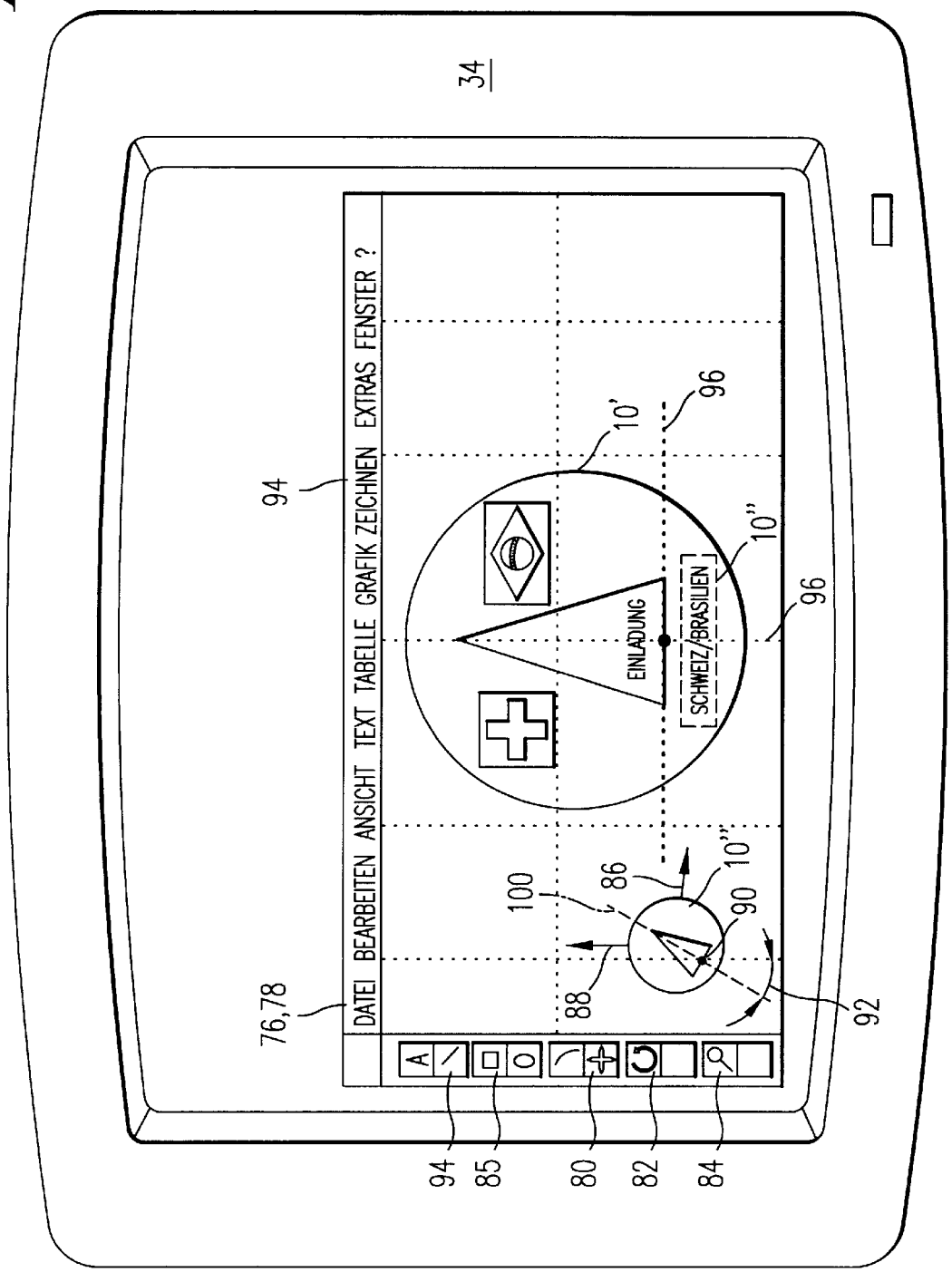

METHOD AND DEVICE FOR OPTICALLY READING A DOCUMENT MODEL WITH A SCANNER AND FOR PRINTING A RECORDING MEDIUM WITH A PRINTER

BACKGROUND OF THE INVENTION

1. Field of the Invention

This invention relates to a method for optically reading a document model with a scanner and for printing a recording medium with a printer as well as a device with a scanner for optically reading a document model and with a printer for printing a recording medium.

2. Discussion of the Background

Both in the business world and in private life one is often faced with the task of filling out a pre-printed form, for example a tax declaration form or an application for some event. This can be done either by hand, which nowadays is rather inconvenient and involves a lot of effort on the part of the recipient to decipher handwriting which is not always very legible. An improvement is achieved if such forms are completed using a typewriter, if such is available. This is not always the case, above all in the private sphere. Moreover it is not always easy to fill out pre-printed forms with a typewriter since limits are imposed by the form's thickness or spacing and by its format. Moreover it is time-consuming and difficult to position the typewriter precisely on the provided field or lines of the form.

With the widespread use of data processing devices, in particular personal computers and printers, computer users have expressed the wish in recent years to complete forms of the aforementioned kind using a computer and a printer. There is of course the known and often makeshift way of scanning a pre-printed form, a so-called document model, with a scanner and of recording it as a document in the computer. Using a software program, the stored document model can be made visible on a data display unit, in particular a screen, and can be completed there with additional data, or respectively filled in with the required data. Such additional data can be entered in the computer, for example, using a keyboard, and can be added to the displayed document model using a data processing program. The displayed document model with the completed data can be transmitted to a printer, which prints this on a blank sheet of paper, which is usually used as the recording medium. In DE 39 35 713 an image generating device is described which works this way. This has a common control unit as well as a scanner and a printer. The scanner and the printer can be placed on the control unit, and with this device an image can be made of a form by scanning and can be stored in a memory, or a sheet of paper can be printed with data from the memory. The scanner and the printer can be lifted off the control unit and can be operated individually. The subject matter disclosed in this patent document is suitable, through well-aimed operation, for scanning an image or image section from a model and storing it, and printing the stored information in a second, separate step at a very specific location on a sheet of paper, which sheet is not identical to the original document.

It is often required, however, that the original, pre-printed form be completed and returned. This is the case, for example, with tax declaration forms in numerous cantons of Switzerland. Now if one tries to complete an original form with a computer and printer, one is confronted with great difficulties. Even if it seems obvious to develop a software program which allows a scanned original form to be displayed on a screen and to be completed with supplementary data in the desired places, the original form then being fed into the printer, and the printer being so controlled that only the supplementary data are printed, the mentioned difficulties cannot be overcome. Through the double handling of the original form, once during feeding of the form into the scanner and a second time during feeding of the form into the printer, there occurs an almost unavoidable, undesirable mismatch between the form position in the scanner and in the printer. This results in the data completed with the computer not being printed exactly in the place foreseen therefor, but rather offset. This is annoying since either a new form to be filled out must be obtained from the responsible office, or the responsible office receives the imprecisely completed form, which is difficult to read, and which is certainly not readable by machine.

SUMMARY OF THE INVENTION

It is thus the object of this invention to present a method and to create a device with which an original document model can be filled out with the aid of a scanner, a computer and a printer, without the aforementioned mismatch between the scanned form and the printed form occurring.

This object is achieved with a method of optically reading a document model with a scanner and of printing a recording medium with a printer, the document model or the recording medium, respectively, being shifted with a transport device relative to the scanner and the printer along a transport path and being led past both the scanner and the printer, wherein the document model, after optical reading, is brought together with the printer and is printed as the recording medium.

The inventive device to attain the object comprises a scanner for optical reading of a document model and a printer for printing of a recording medium, as well as a transport device for relative shifting of the document model or of the recording medium, respectively, along a transport path, and is characterized in that means are provided to bring the document model, after optical reading, together with the printer and to print it as the recording medium, the document model and the recording medium being identical and remaining in the device between the scanning step and the printing step.

Since the document model, which is identical to the recording medium, is printed without leaving the device between the scanning step and the printing step, a double manual feeding of the document model is not necessary. Thus the aforementioned mismatch does not occur. It is possible, however, for the document model to be introduced into the device already askew. In this case a software program, which displays the scanned document model on a data display device of a computer, in particular on a screen of a personal computer, shows the scanned document model on the screen also in an askew position. So that the scanned document model visible on the screen can be easily filled in with data, for example using a data processing program, the scanned document model has to be moved from the said askew position into a defined position. This can be achieved using software in that tools are provided with which the document model on the screen is shifted in an X and/or Y direction, with which the document model can be rotated about a given software-defined pivot point, and with which the displayed document model can be enlarged or reduced in size.

Now when the document model is in a defined position, preferably aligned with the screen axes, it can be easily completed with characters, graphic symbols and/or other objects. Characters, symbols and/or objects can thereby be displayed on the screen in a desired position aligned with the document model. For example, empty fill-in frames can be defined as objects, which can then be completed with written characters or other information. Such fill-in frames have the advantage of making it possible to fill out forms of the same kind more quickly and more easily in that the cursor only has to jump to the fill-in frames. The sizes of fields and the types of script here can already be predefined. Fill-in frames of this kind can also be stored as files belonging to a very specific document model.

If the shift and/or rotation movements and the changes in size needed to bring the displayed document model into a defined position are stored as transformation parameters in a data memory of a computer, then these transformation parameters can be used later to convert the completed data and to adjust them, before printing, to the physical position and size of the document model which in this case has been introduced askew into the device. When printed, the completed data then appear exactly in the right place and in the proportionally correct size and alignment with respect to the physical document model, which corresponds to the form completed with data shown on the screen.

The data with which a document model on the screen is completed can be entered into a computer using a data input device, in particular a keyboard, or can be called up from a file provided in a data memory, which is advantageous in the case where the same form is completed several times.

In the last-mentioned case it cannot be prevented that between entering the individual document models, which are all supposed to be filled out in the same way or are supposed to be provided with a series of addresses, like serial letters, a shift occurs with respect to an assumed model zero point. So that the difficulties mentioned at the beginning do not arise, either the previously described transformation after each scanned document model must be made before data completion, or it can be foreseen that the software itself has a tool with which during the scanning of the first document model a model zero point or, respectively, a model zero line, a reference place or a reference position is defined so that the software program itself can recognize a mismatch between the individual document models, in the case of subsequent document models of the same kind, and using software can compensate for it through further transformation parameters, which are determined by means of the differing position of the document zero points or document zero lines, respectively of the reference places or reference positions.

The software program, which is part of this invention, has moreover tools, with which the scanned document models can be stored together with the completed data in a file in the data memory or with which only the completed data can also be stored as a file of the data memory.

So that, when the document model has been completed on the screen with further data after the scanning step, the printing step can begin at the right place on the document model, means are to be provided preferably along the relative transport path between the document model and the scanner and the printer with which the relative position of the document model, or respectively the document model which has become the recording medium, can be precisely determined with respect to the scanner or to the printer. This can be achieved, for example, in that a foremost end edge or a foremost end point of the document model is detected with these means. This is possible with, among others, optical means, with photoelectric barriers, in particular with a striated light curtain.

Moreover it can be foreseen that with the transport device for shifting the document model, or respectively the recording medium, a path is followed which runs in a straight, essentially horizontal course from a feed device for the document model to an output device for the recording medium, or respectively the document model. In a first embodiment, large spacing is foreseen between the scanner and the printer, which are disposed along the transport path, such that a document model to be scanned having the largest possible format can be situated between the scanner and the printer. This necessarily leads to relatively large scanner/printer units.

A reduction in the size of such a unit can be achieved in that the transport device is designed in such a way that the document model, or respectively the recording medium, can be transported forwards and backwards inside the device. A document model can then be completely read with the scanner, then transported back until the foremost end of the document model lies immediately in front of the printer in order to be then printed with the completed data. Through such a forwards/backwards change-over of the conveying device of the transport apparatus it is possible to reduce to a minimum the aforementioned spacing between the scanner and the printer in a second embodiment.

A straight transport path has moreover the advantage that relatively thick, or respectively relatively stiff, documents can also be processed faultlessly.

Of course it is also possible, and this is indicated in the claims by the term "relative", to place the document model on a supporting tray and, by means of the transport device, to move the scanner/printer unit with respect to the stationary document model, instead of moving the document model as in the preceding examples. Involved in such a third embodiment is only a kinematic reversal of the motional course.

A fourth embodiment foresees a flatbed scanner, to which a printer is subsequently connected. In this case, a transport device would further transport the document model, lying on the flatbed scanner, to the printer.

A reduction in size of the scanner/printer unit could be achieved according to a fifth embodiment in that the transport path does not run straight, but follows an essentially U-shaped course. The scanner and the printer could then be disposed one on top of the other. Advantageous in this case would be that the feed device and the output device would be situated on the same side, one on top of the other. On the other hand, in a scanner/printer unit with this kind of design the transport of relatively thick and/or stiff forms may not be entirely unproblematical, owing to the turning around.

If the document model is shifted, the transport device comprises at least one conveying element. This can consist of a plurality of roller or cylinder pairs, in each case an upper roller lying resiliently on top of a lower roller and forming a roller pair through which the document model can be led along the transport path. Preferably foreseen as the conveying element, however, is a driven conveyor belt on which the document model lies and is led along the transport path.

It is important to ensure that during the entire processing step scanning-printing the document model is not shifted with respect to its initial position, or does not slip on the transport element, thereby deviating from the transport direction. This can be relatively easily achieved in all the mentioned embodiments by means of contact pressure springs or pressing plates with which the document model is held on the support tray or is pressed against the conveyor belt, or, respectively, by providing a minimal spacing of roller pairs in the transport direction.

While in the first four example embodiments mentioned, the scanner and the printer are situated in the same physical and logical plane, in the fifth example embodiment, with U-shaped transport path of the document model, the scanner and the printer are in the same logical plane. The physical plane here is not the same since the scanner and the printer are disposed over one another.

Of course it is also possible to accommodate the entire device according to the invention in a desktop or laptop computer. Laptop computers in which a printer is built in already exist. The additional provision of a scanner in such computers is merely a question of time.

That the previously mentioned software program also comprises further tools, so that individual scanning steps and printing steps alone can be carried out in the conventional manner, does not have to be particularly mentioned.

BRIEF DESCRIPTION OF THE DRAWINGS

Using example embodiments, which are shown in the figures, the invention will now be explained more closely. Shown are.

DISCUSSION OF THE PREFERRED EMBODIMENTS

Figure 1:
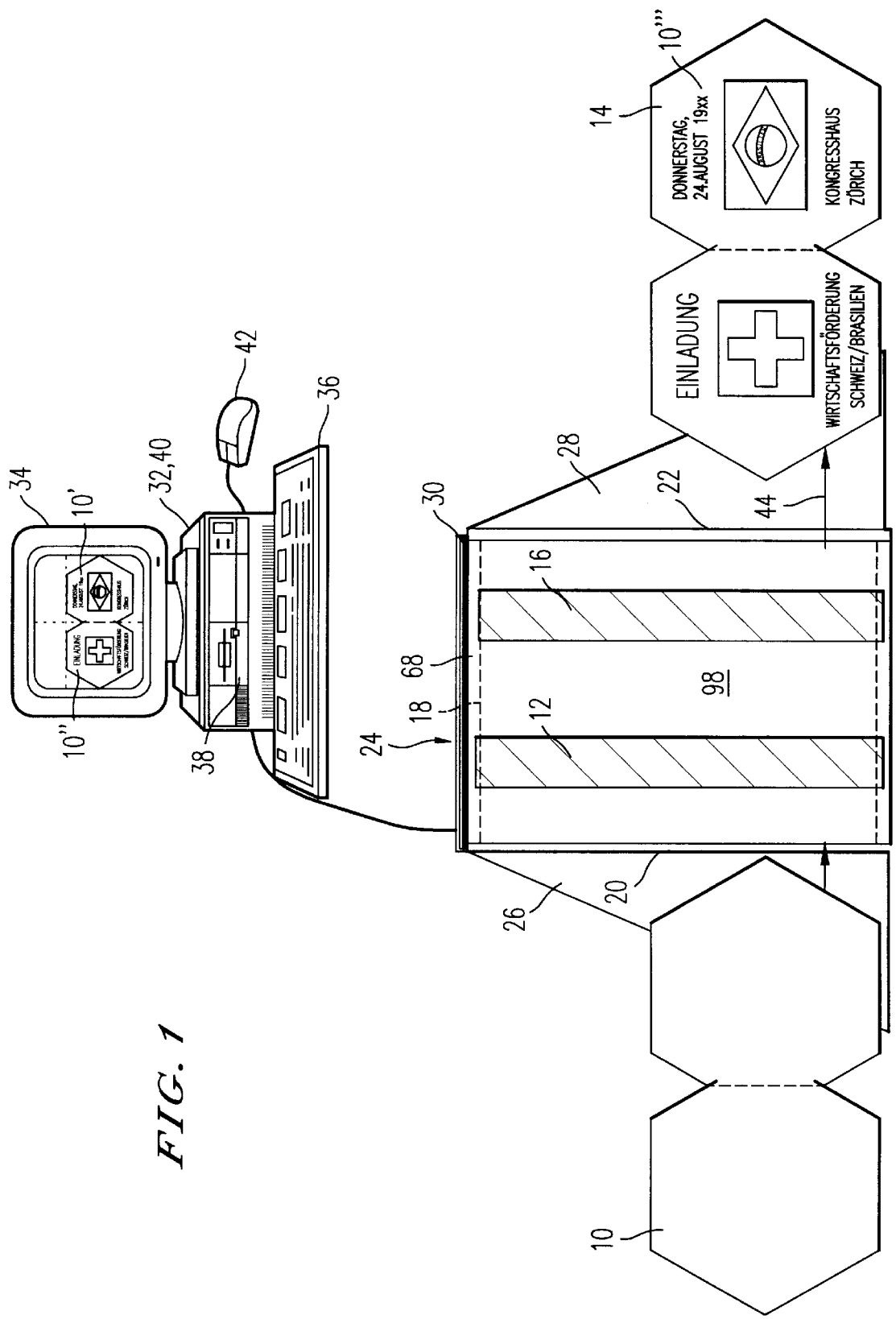
FIG. 1, a diagrammatic view of a preferred embodiment of a device according to the invention.

The preferred example embodiment shown in FIG. 1 of a device according to the invention comprises a scanner/printer unit 24, which, for its part, has a basic housing 68, in which a transport device 18 is disposed, in order to convey a document model 10 placed on an input tray 26, in particular a pre-printed form, from a feed device 20 along, in this example embodiment, a straight transport path determined by the transport device 18 to an output device 22 and to emit it there on an output tray 28. The transport direction is indicated by the arrow given the reference symbol 44. The transport device 18 can comprise several pairs of rollers, each with two rollers lying one above the other, pressed resiliently together, or can be designed as a conveyor belt. Disposed above the transport device 18 are a scanner 12 for optical reading of the document model 10 and a printer 16 for printing, in particular for printing the document model with supplementary data. Both devices 12, 16 are disposed along the transport path, the scanner 12, seen in the transport direction 44, extending in front of the printer 16.

The recording medium printed by the printer 16 is designated by the reference symbol 14. In carrying out the method according to the invention, the document model and the recording medium are the same. The data with which the pre-printed form is completed are designated by 10'''. The reference symbol 30 indicates a hinge, with which a module 98 of the scanner/printer unit 24, comprising the scanner 12 and the printer 16, can be swung or pivoted open with respect to the basic housing 68. A design of this kind is particularly advantageous for cleaning purposes and above all for correcting any transport problems which may arise for the document model 10.

The scanner/printer unit 24 is connected to a computer 32 via a cable, which has not been further designated. In the example embodiment shown, this computer is a personal computer equipped in a known way to which a data display device, in particular a screen 34, and a data input device, in particular a keyboard 36, are connected. A mouse 42 is also connected to the computer 32 for control of programs. In addition to a hard disk which has not been further designated, the computer further comprises a further data input device, a floppy disk station 38. Both the immediate access storage of the computer, the hard disk and the floppy disks, readable and writable using the floppy disk station 38, are provided as data memories of the computer.

Indicated with 10' on the screen 34 is the scanned document model, which has been completed with supplementary data such as alphanumerical symbols, written characters, graphic symbols or other objects, which are designated by 10".

Figure 2:
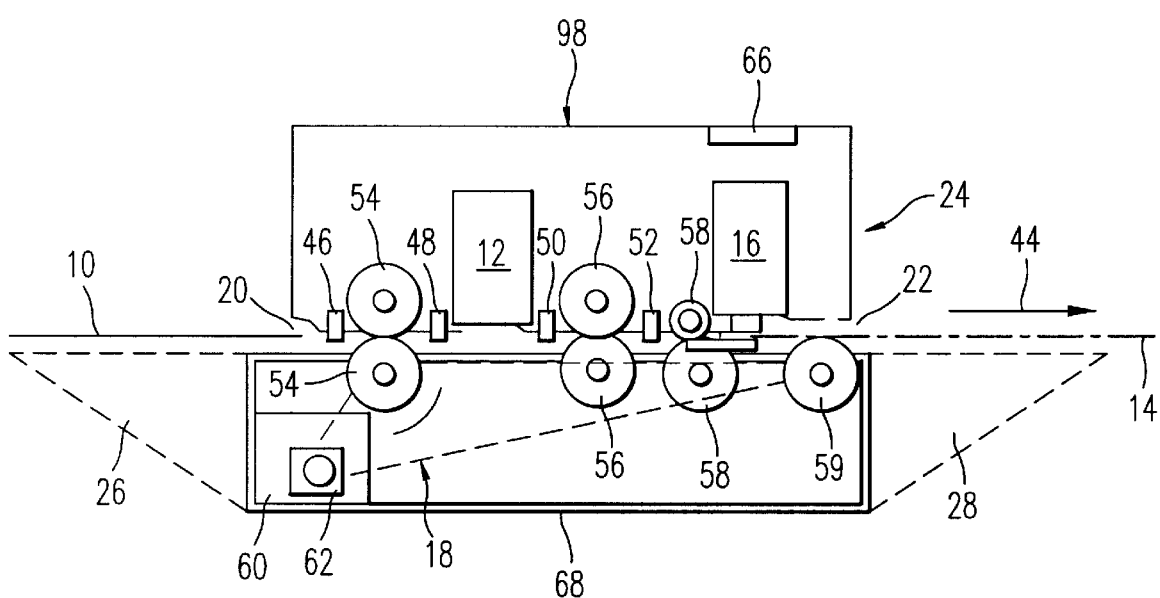
FIG. 2, a side view of a scanner/printer unit of the device according to FIG. 1.

The scanner/printer unit 24 is shown diagrammatically in a side view in FIG. 2. The scanner/printer unit, according to the shown design, can be constructed very compactly, in a space-saving and low-cost way. With it document models 10 of the most various sizes, thicknesses and formats can be scanned, processed on the aforementioned personal computer, and then printed with completed data. It is also possible of course to use the scanner/printer unit only as a scanner or only as a printer or as a fax as well as a simple copier. The various functions can be entered from an operating board 66, for example, or can be input by computer by means of software.

The scanner/printer unit 24 comprises the basic housing 68, in which the transport device 18 is disposed. In the example embodiment shown, the transport device has four lower rollers 54, 56, 58, 59 driven with a rotating belt. Foreseen as the driving means is an electromotor 62, which is reversibly drivable with a control device 60.

Disposed on each side of the basic housing 68 are the input tray 26 for feed of the document model 10, by means of the feed device 20, and the output tray 28, on which the document model 10, respectively a recording medium 14, processed in the scanner/printer unit 24, is emitted by means of the output device 22. Disposed above the basic housing 68 is the module 98, which comprises as most important components the scanner 12 and the printer 16. Furthermore in module 98 upper rollers 54', 56', 58' are disposed pivotably and resiliently in a vertical direction. These upper rollers 54', 56', 58' press on the previously mentioned corresponding lower rollers 54, 56, 58, and with these form three pairs of rollers each, through which the document model to be scanned and printed is guided. Each pair of rollers corresponds thereby to a driven conveying element. As already mentioned, in a variant embodiment, a rotating conveyor belt could be provided as the conveying element, instead of the lower rollers 54, 56, 58. The upper rollers 54', 56', 58' could be replaced in that case with contact pressure springs or pressing plates to press a document model 10 against the conveyor belt. A further lower roller 59 is foreseen, disposed after the printer 16, to eject the document model 10, or respectively the recording medium 14, from the scanner/printer unit 24 onto the output tray 28.

To determine the physical position of a document model 10 along the transport path inside the scanner/printer unit, and in particular to be able to shift the document model 10 into a particular desired position, a first, second, third and fourth detection element 46, 48, 50, 52 is disposed along the transport path. In the example embodiment shown, these are reflective photoelectric barriers. An initial contour point or an initial edge of a document model, or respectively an end contour point or an end edge of a document model can thereby be detected, for example. To ensure as precise a positioning of a document model as possible, a striated light curtain is preferably used for each detection element 46, 48, 50, 52, which light curtain can extend over the entire width of the scanner/printer unit 24.

In the example embodiment shown, the spacing in the the transport device 44 between the scanner 12 and the printer 16 is relatively minimal. The scanning and the subsequent printing of an already pre-printed form can take place as follows: the first detection element 46 detects when a document model 10 has been inserted into the feed device 20. The electrical signal thereby generated by the first detection element 46 causes, via the computer 32 or via the control device 60, the start-up of the transport device 18 in the transport direction 44. The document model 10, which has been forwarded manually up to the first roller pair 54, 54', is now further transported by means of the transport device 18 until a first contour point of the document model is detected by the second detection element 48. The transport mechanism is stopped for a short time. The document model 10 is now in a ready position for a subsequent scanning step. For this purpose, after the transport device 18 has been switched on again, the document model is conveyed forwards in the transport direction 44, passing under the scanner until the third detection element 50 recognizes the final contour point of the scanned document model 10. The transport mechanism is stopped again. Depending upon the length of the document model, its foremost end can already be located in the area of the output device 22 or respectively below the printer 16. Now, before the document model can be printed with completed data, it must be brought into a defined exit position relative to the printer 16. For this purpose the transport mechanism is switched on again, however now in the direction opposite to the transport direction 44. The scanned document model 10 is thereby conveyed back toward the feed device 20 until the fourth detection element 52 recognizes an end contour point, with respect to the inverted transport direction. The transport mechanism is stopped again. Now, as explained later on, the scanned document model 10', made visible in the meantime on the screen 34 of the personal computer 32, can be completed with supplementary data. When this has been done, the completed data will be printed on the pre-printed form, the previously scanned document model 10. For this purpose the transport mechanism is switched on again, and the document model 10 is conveyed under the printer 16, is printed there with the completed data, and at the output device 22 is emitted on the output tray 28.

Pure scanning steps, printing steps, copying or faxing processes according to the state of the art are not covered by the invention, and are therefore not further described.

Figure 3:
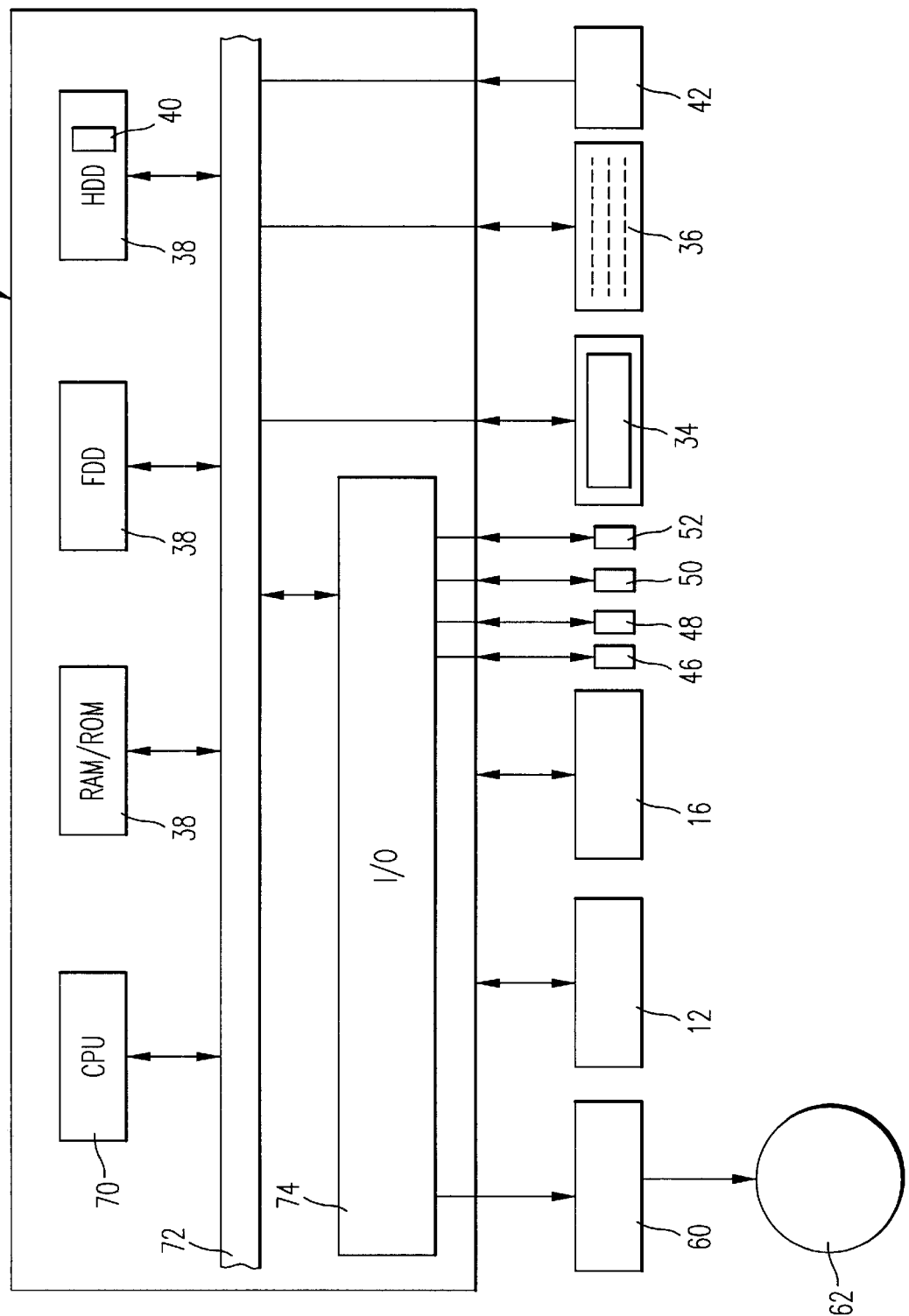
FIG. 3, a block diagram of the device according to FIG. 1.

In the block diagram according to FIG. 3, the set up of the computer 32 is shown. It is essentially a standard personal computer with a bus system 72, to which the data processor (CPU) 70 and various data memories 38 are connected. These are a main memory (RAM/ROM), a floppy disk read/write device (FDD) and a hard disk (HDD), the two last-mentioned data memories being equipped with the corresponding controllers (not shown). Connected to the computer 32—this is also shown only schematically—are the screen 34, the keyboard 36 and the mouse 42. An input/output circuit (I/O) 74 is foreseen to read the signals sent by the detection elements 46, 48, 50, 52, to process them according to a software program 40, and to set in motion or stop the motor 62 of the transport device 18 through the control device 60, as previously described. Also connected to the input/output circuit are the scanner 12 and the printer 16. Standard interfaces and drivers are provided.

Control of the scanning and printing process, as previously described, with the completion with supplementary data of the scanned document model 10' displayed on the screen inbetween, is achieved by means of a specially developed software program 40. This is normally stored on the hard disk (FDD) 38 and is loaded in the main memory (RAM) for execution. More details about the features and the individual tools, foreseen in software program 40, can be learned in the following from the application example presented according to FIGS. 4 and 5.

Figure 4:
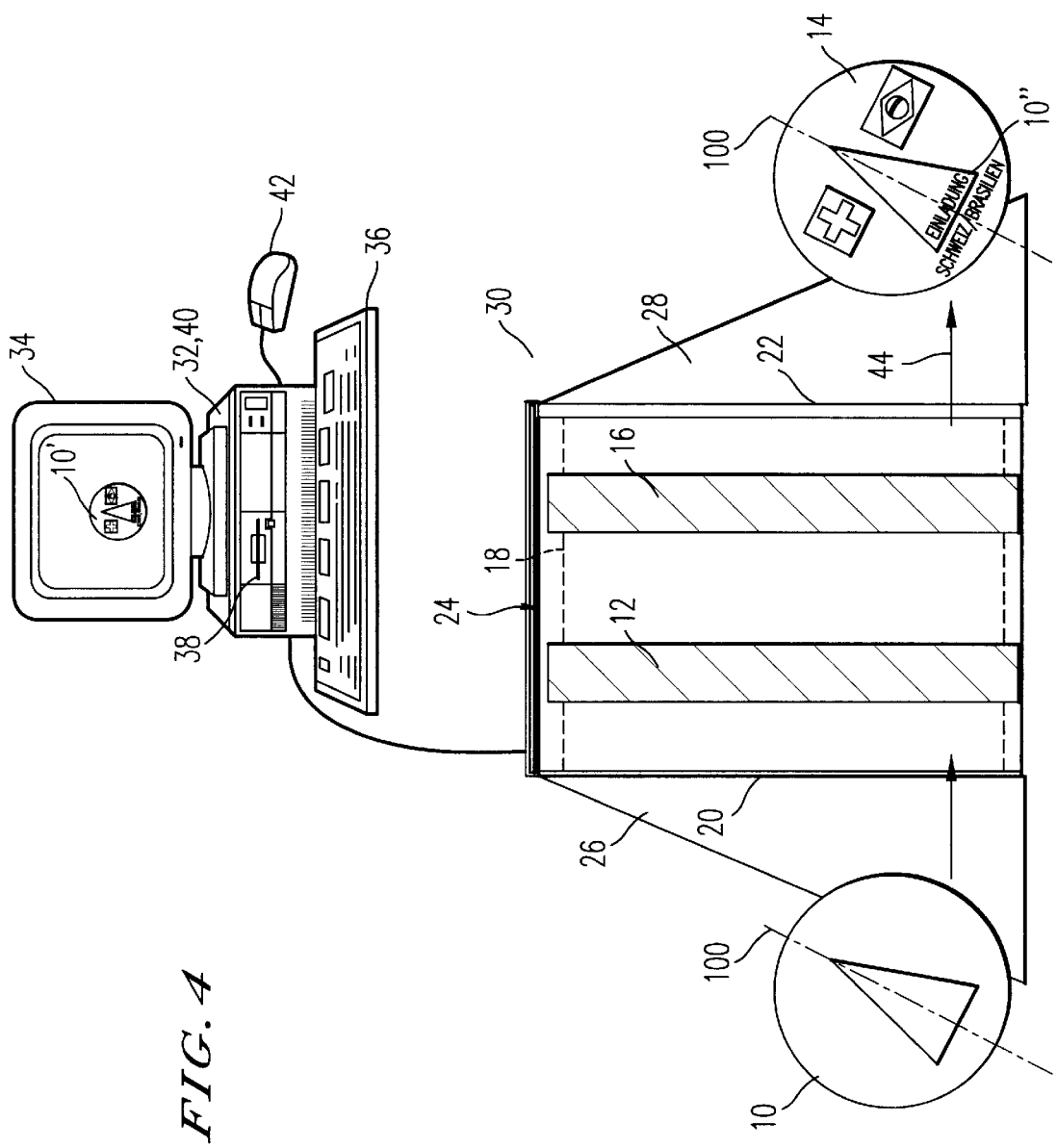
FIG. 4, the device according to FIG. 1 to explain a scan/print step with reference to an application example, and FIG. 5, the display on a screen for the application example according to FIG. 4.

A complete device according to the invention is shown in FIG. 4, as has already been described in the foregoing. Selected here intentionally as the document model 10 is a circular form on which an acute isosceles triangle has been pre-printed. The aim now is to print this document model 10 with supplementary data symmetrically with respect to a line of symmetry 100 running through the acute angle of the triangle. As FIG. 4 shows, it is difficult, and hardly possible within a reasonable amount of time, to introduce the circular document model 10 into the feed device 20 in such a way that the said line of symmetry 100 lies exactly at a right angle to the transport device 44. It is highly probable that the circular document model 10, as the figure shows, will be fed into the feed device 20 of the scanner/printer unit 24 in a slanted position of some kind. The scanning step takes place as previously described. An initial contour point of the circular model disk and an end contour point of the disk will be thereby detected by the second and the third detection elements 48, 50. The scanned model is shown on a certain scale on the screen 34, as is visible in FIG. 5, for example, in the lower left corner. The acute triangle of the scanned document model 10' displays thereby exactly the same slanted position as that resulting from the slanted feeding of the original document model 10 in the scanner/printer unit 24.

The scanned document model 10' in FIG. 5 is not in a suitable position and size to be completed with additional data. A transformation is necessary. The scanned document model 10' is now rotated using a tool, in this case using a fourth tool 82, about an assumed pivot point 90 by an angle 92 until the said line of symmetry 100 comes to lie parallel to a vertical line of a grid 96 displayed on the screen. Using the third tool 80, the scanned document model 10', which has been rotated by the angle 92, is shifted, for example, to the middle of the screen, and is enlarged using a fifth tool 84, so that a processing of the scanned document model 10' can now take place easily. The said transformation steps can of course be carried out in any desired sequence. Each individual step can also be carried out in several smaller steps. Designated by the reference symbol 85 is a sixth tool with which, for a scanned document, model fill-in frames 83 of a desired size can be positioned at a desired place on the screen. This makes it possible in particular to fill out more quickly several document models of the same kind with different data. The cursor can jump directly to the fill-in frames. Features can be defined for each fill-in frame, such as, for example, type of script.

Using the keyboard or another data input device, the scanned document model 10' is now provided with written characters 10", for example parallel to the base line of the pre-printed triangle. In the area of the vertical angle of the triangle, right and left therefrom, flags are inserted, for example, from an object module library, which is provided nowadays in practically every computer. This is a step which can be easily carried out with the known Windows program of Microsoft and with the mouse 42, for example using the drag and drop method.

After completion of the scanned document model 10', this document model can be stored, using a first tool 76, either together with the completed data 10" in one of the said data memories 38 or only the completed data can be stored in the data memory 38. Predefined or already pre-completed fill-in frames 83 associated with a particular document model can likewise be stored as a data file in one of the said data memories 38. A printing command can be given with a second tool 78, after which the document model 10, still located in the scanner/printer unit, can be printed with the completed data 10'''. Alignment of the document model 10 with respect to the printer 16 takes place using the fourth detection element 52, as already described in the foregoing (FIG. 2).

As can also be seen from FIGS. 4 and 5, the completed data 10" are provided on the screen on an enlarged scale with respect to the originally scanned document model 10' and turned with respect to the actual physical position of the document model 10 in the scanner/printer unit 24. These completed data 10" must be transformed before being printed out, so that they are correct with respect to the base line of the triangle and proportionally correct with respect to its size in the completed document model 14, shown in FIG. 4 on the output side 28 of the scanner/printer unit 24. The computer has obtained the transformation parameters, with which the completed data 10" are to be converted, from the rotation of the originally scanned document model 10' by an angle 92 and from the amounts of shift in the X direction 86 and in the Y direction 88 between the originally scanned document model 10' and that which has been used as the model on the screen to be completed with supplementary data. The factor of a size change, which has been carried out, is also known with respect to amount. These transformation dimensions, which originated during copying and transforming the originally scanned document model 10' (FIG. 5, below left) into the enlarged document model 10' disposed centrally on the screen, have been stored in an area of the data memory and can be used to convert the supplementary data 10", with which the document model 10' centrally disposed on the screen has been completed, to the position, size and orientation of the physical document model 10 which is located in the scanner/printer unit 24.

Indicated by the reference symbol 94 are further tools, which nowadays practically every word and graphics processing software program has which can be run with Windows. A further description of all these known further tools is thus unnecessary.

I claim:

1. Device with a scanner for optical reading of a document model and with a printer for printing of a recording medium, said scanner and said printer being adjacent, and with a transport device for relative shifting of a document model or of a recording medium, respectively, with respect to the scanner or the printer, respectively, along a transport path, and with means to reverse a document model, after optical reading, to a defined position with the printer and to print it as the recording medium, the document model, being identical to the recording medium and remaining in the device between the scanning step and the printing step, wherein the device comprises a computer with at least one data display device, with a data input device, and with a software program, it being possible with the software program to display the optically read document model on the data display device and to complete it with data from the data input device.

2. Device according to claim 1, wherein the data input device is a keyboard or a data memory.

3. Device according to claim 1, characterized by a mouse to control the software program.

4. Device according to claim 1, wherein the software program comprises a first tool, with which the document model displayed on the data display device can be stored together with the completed data in the data memory or with which the completed data alone can be stored in the data memory.

5. Device according to claim 1, wherein the software program comprises a second tool, with which only those data with which the document model displayed on the data display device has been completed, can be transmitted to the printer.

6. Device according to claim 1, wherein the software program comprises a third, fourth and fifth tool to transform, by means of software, the document model shown on the data display device, in particular to shift it in an X- and/or Y-direction, and/or to rotate it about a pivot point, determined by software, by an angle, and/or to enlarge or reduce in size, respectively, the document model.

7. Device according to claim 6, wherein the software program has first means with which the movements of the document model displayed on the data display device, movements carried out with the third, fourth and fifth tools, can be stored as transformation parameters in the data memory.

8. Device according to claim 7, wherein the software program has second means, with which the completed data can be converted, using the transformation parameters, before being transmitted to the printer and can be adjusted to the physical position and size of the document model and can be printed thereon as transformed, completed data.

9. Device according to claim 1, wherein elements are provided along the transport path to determine the relative position of the document model with respect to the scanner or to the printer, respectively.

10. Device according to claim 1, wherein the transport device comprises at least one conveying element for transport of the document model relative to the scanner and printer, and a control device is provided to switch the drive direction of the conveying element from a forwards transport to a relative backwards transport and vice-versa.

11. Device according to claim 1, wherein the computer is a personal computer, the data display device is a screen, and the data input device is a keyboard.

12. Device according to claim 2, characterized by a mouse to control the software program.

13. Device according to claim 2, wherein the software program comprises a first tool, with which the document model displayed on the data display device can be stored together with the completed data in the data memory or with which the completed data alone can be stored in the data memory.

14. Device according to claim 2, wherein the software program comprises a second tool, with which only those data with which the document model displayed on the data display device has been completed, can be transmitted to the printer.

15. Device according to claim 2, wherein the software program comprises a third, fourth and fifth tool to transform, by means of software, the document model shown on the data display device, in particular to shift it in an X- and/or Y-direction, and/or to rotate it about a pivot point, determined by software, by an angle, and/or to enlarge or reduce in size, respectively, the document model.

16. Device according to claim 2, wherein elements are provided along the transport path to determine the relative position of the document model with respect to the scanner or to the printer, respectively.

17. Device according to claim 2, wherein the transport device comprises at least one conveying element for transport of the document model relative to the scanner and printer, and a control device is provided to switch the drive direction of the conveying element from a forwards transport to a relative backwards transport and vice-versa.

18. Method of optically reading a document model with a scanner and of printing a recording medium with a printer, said scanner and said printer being adjacent, the document model or the recording medium, respectively, being shifted with a transport device relative to the scanner and the printer along a transport path and being led past both the scanner and the printer, and, after being read optically, being reversed and brought to a defined position with the printer and being printed as the recording medium, wherein after reading of the document model with the scanner, the document model is made visible on a data display device of a computer and is completed with data from a data input device, and the document model is then printed as the recording medium with the completed data only.

19. Method according to claim 18, wherein the document model, made visible on the data display device, is put into a display position, defined with respect to the data display device, by means of shifting, rotating and/or change of size using software, and is then completed with the data.

20. Method according to claim 19, wherein the amounts of shifting movement and/or of change in size as well as an angle of rotation of the rotating movement are stored as transformation parameters in a data memory, the transformation parameters being used before the printing step to correlate the completed data to the physical position and size of the document model or of the recording medium, respectively, and to print them as transformed, completed data.

* * * * *